United States Patent Office 3,780,193
Patented Dec. 18, 1973

3,780,193
PRODUCTION OF WAFFLES AND LIKE FOOD PRODUCTS
David Charles De Jersey, East Bentleigh, Victoria, Australia, assignor to C. L. De Jersey & Sons Proprietary Limited, Moorabbien, Victoria, Australia
Continuation of abandoned application Ser. No. 476,582, Aug. 2, 1965. This application Apr. 24, 1970, Ser. No. 29,745
Claims priority, application Australia, Aug. 3, 1964, 47,680/64; Aug. 6, 1964, 47,819/64
Int. Cl. A21d 13/08
U.S. Cl. 426—505       12 Claims

ABSTRACT OF THE DISCLOSURE

A method and apparatus for the continuous production of waffles and like products in the form of a continuous moving strip for severing into individual waffle units, in which dough mixture is fed to the trailing end of an endless moving succession of upper and lower co-acting molding and cooking plates between which the continuous strip of waffles is molded and cooked, wherein the trailing end of the strip is progressively formed by a directly-downward moving of the upper trailing plate of said endless succession of plates co-acting with the registering lower plate and by said co-acting trailing plates being maintained pressed together during the period of initial molding and cooking of the dough mixture.

---

This application is a continuation of Ser. No. 476,582, filed Aug. 2, 1965, now abandoned.

This invention relates to apparatus for making waffles and like hot-plate goods, the term "hot-plate goods" as used herein including other food products cooked from dough mixtures or batter which will form batter cake analogous to waffles. In the following description, reference will be made to the making of waffles, but it is to be understood that the apparatus described herein is equally adaptable for cooking other such hot-plate goods as indicated, by making suitable simple adjustments as may be necessary by the particular nature of the goods to be produced.

Waffle-making machines or devices have hitherto consisted of waffle-irons which are adapted to cook only single units and thus have a restricted or limited output. In contrast, the apparatus of the invention provides for the production of waffles and like hot-plate goods in continuous strip form, the strip being adapted to be subsequently severed into suitable individual waffle units. In this way, a continuous production of waffles and like hot-plate goods is provided which has an output limited only by the rate at which the machine of the invention can be conveniently operated automatically.

Thus, in accordance with the invention there is provided a method of making waffles and like food products in the form of a continuous strip which is subsequently severed into suitable individual waffle units, said method comprising moving a succession of complementary pairs of waffle molding and cooking plates which have opposed waffle molding faces and are arranged in side-by-side relationship so as to form upper and lower continuous stretches of said plates between which the continuous waffle strip can be molded and cooked, feeding a waffle-making dough mixture between the opposed waffle molding faces of said plates at a trailing end of said stretches of plates, heating said stretches of plates whereby the dough mixture is molded and cooked between said opposed faces of the plates so as to form a continuous waffle strip, discharging the continuous waffle strip from between said moving stretch of plates at a leading end of said stretches of plates, and severing the discharged continuous waffle strip into selected waffle units.

In carrying out the method of the invention the preferred procedure comprises moving a succession of the waffle molding and cooking plates forming the lower stretch of said plates, depositing the complementary waffle molding and cooking plates in succession onto the lower stretch of said plates at a selected distance from a trailing end of said lower stretch of plates so as to form the upper stretch of plates in register with the plates of said lower stretch, feeding the waffle-making dough mixture onto the waffle-molding face of a plate of said lower stretch of plates between said trailing end of said lower stretch of plates and the registering plate on which said complementary plates are deposited in succession, heating said stretches of plates as defined, discharging the continuous waffle strip as defined, and severing said continuous waffle strip as defined, said complementary plates being deposited in succession from the bottom of a stack of such plates which are bodily deposited so as to rest on the registering plate of said lower stretch of plates during the initial molding and cooking of the waffle-making dough mixture between said registering plates in progressively forming the trailing end of said continuous waffle strip.

In carrying out the preferred method of the invention the described steps of moving the succession of waffle molding and cooking plates forming the lower stretch of plates, depositing the stack of complementary waffle molding and cooking plates onto said lower stretch of plates in depositing successive registering plates forming the upper stretch of plates, discharging the continuous waffle strip from between the stretches of plates, and severing the continuous waffle strip into suitable waffle units, should be intermittent for convenience of operation and so that each step can be in timed relationship, as hereinafter indicated. The construction of the waffle molding and cooking plates constituting the upper and lower stretches of such plates should also conveniently be as hereinafter indicated.

A machine for making waffles and like food products in accordance with the present invention comprises upper and lower movable continuous stretches of waffle molding and cooking plates formed by a succession of complementary pairs of such plates in side-by-side relationship and adapted to be moved from a trailing end of the machine to a leading end of the machine and having opposed waffle molding faces between which there is a continuous gap suitable for forming a continuous waffle strip therebetween, means for moving said side-by-side complementary pairs of plates from the trailing end of the machine to the leading end of the machine in endless succession, means for feeding a waffle-making dough mixture to said stretches of plates at a trailing end of said stretches of plates whereby the dough mixture continuously fills said gap between the opposed faces of each complementary pair of plates at the trailing end of said stretches of plates, means for heating said upper and lower stretches of plates whereby said dough mixture between the opposed faces of said stretches of plates can be cooked to form a continuous waffle strip, and waffle severing means for severing the continuous waffle strip into selected waffle units after said continuous waffle strip discharges from between said upper and lower stretches of plates at the leading end of said machine.

The preferred arrangement in the machine of the invention is the provision of a lower movable stretch of waffle molding and cooking plates as defined, means for depositing complementary waffle molding and cooking plates as defined in succession onto said lower movable stretch of plates at a selected distance from the trailing end of said lower stretch of plates so as to form the upper stretch of plates in register with said lower stretch of plates, each said complementary plate being deposited in succession from the bottom of a stack of such plates periodically bodily deposited so as to rest momentarily on the registering plate of said lower stretch of plates in thereby progressively forming the trailing end of said upper stretch of plates, and the means for feeding the waffle-making dough mixture being adapted to deposit said dough mixture onto the upper face of a selected plate of said lower stretch of plates between said trailing end of said lower stretch of plates and the registering plate on which each said complementary plate is deposited in succession.

In the machine of the invention, the lower movable stretch of waffle molding and cooking plates preferably is the upper flight of an endless conveyor of such plates linked together endlessly, with said upper flight substantially horizontal. The upper movable stretch of waffle molding and cooking plates of the machine preferably is formed by a succession of loose plates which are adapted to be carried by the upper flight of the endless conveyor from the trailing end of said endless conveyor to the leading end of said conveyor. In this arrangement, the succession of loose plates is relatively endlessly delivered to the trailing end of the conveyor, the plates relatively endlessly removed from the leading end of the conveyor after traversing the upper flight of said conveyor, and the plates relatively endlessly returned to the trailing end of the conveyor.

According to a preferred practical embodiment, a machine in accordance with the invention preferably comprises an endless conveyor embodying linked waffle molding and cooking plates and having a substantially horizontal upper flight which is adapted to carry an endless succession of loose complementary waffle molding and cooking plates from the trailing end of said conveyor to the leading end of said conveyor and in registering paired relationship with the linked waffle molding and cooking plates of said substantially horizontal upper flight of the endless conveyor, an overhead track means disposed above the endless conveyor and extending between the trailing end and the leading end of said conveyor, means near the leading end of said endless conveyor for elevating each successive loose plate at the leading end of said conveyor to the trailing end of said overhead track means, propelling means associated with said overhead track means for moving said loose plates in succession from the trailing end of said overhead track means to the leading end of said overhead track means, means near the leading end of said overhead track means for returning said loose plates in succession to the trailing end of the endless conveyor, waffle-dough delivery means near the trailing end of the endless conveyor for feeding a waffle-making dough mixture onto the upper face of the waffle molding and cooking plates of said substantially horizontal upper flight near the trailing end of the endless conveyor so that the dough mixture is fed into and fills a gap between the opposed waffle-molding faces of said succession of loose plates and the linked plates of said endless conveyor in the course of each successive loose plate being located in paired relationship with the complementary linked plate at the trailing end of the endless conveyor, means for heating the resultant upper and lower stretches of plates in moving from the trailing end of the endless conveyor to the leading end of the endless conveyor whereby said dough mixture fed between the opposed faces of said coacting stretches of plates is cooked to form a continuous waffle strip, and waffle-severing means near the leading end of said endless conveyor for severing said continuous waffle strip into suitable waffle units after the waffle strip discharges from between said co-acting stretches of plates at the leading end of said endless conveyor.

In the preferred practical embodiment described above, the machine conveniently is operated intermittently, that is to say, the endless conveyor is intermittently movable, the other means of the machine being operated in timed relationship with the intermittent movement of the endless conveyor. Thus, the arrangement is such that each successive loose waffle molding and cooking plate is elevated in succession from the leading end of said endless conveyor when the endless conveyor has halted momentarily in the course of the intermittent movement; an uppermost elevated loose plate is engaged by the propelling means associated with the overhead track means to move a succession of loose plates on the overhead track means from the trailing end of said overhead track means to the leading end of said overhead track means, likewise when the endless conveyor has halted; a lowermost loose plate engaged by the returning means near the leading end of the overhead track means is returned to a selected linked plate of the endless conveyor near the trailing end of said conveyor, likewise when the endless conveyor has halted; a predetermined quantity of waffle-making dough mixture is fed onto the upper face of a linked plate adjacent to the selected linked plate of the endless conveyor to which the lowermost loose plate has been returned so that when said loose plate is deposited in register on the selected linked plate of the endless conveyor, the gap between the contiguous pairs of plates is continuously filled with the dough mixture, likewise when the endless conveyor has halted; and the waffle-severing means is operated to sever a waffle unit from the leading end of the strip of waffles, likewise when the endless conveyor has halted, all in timed relationship as indicated.

A loose-plate loading magazine or shute can be provided near the trailing end of said endless conveyor and the leading end of said overhead track means for receiving said loose plates in succession from the leading end of the overhead track means and holding a stack of such loose plates so that each successive lowermost plate of said stack of loose plates can be delivered in succession onto the endless conveyor near the trailing end as indicated. Similarly, a loose-plate receiving magazine can be provided near the leading end of said endless conveyor and the trailing end of said overhead track means for receiving said loose plates in succession from the endless conveyor near the leading end and holding a stack of such loose plates so that each successive uppermost of said stack of loose plates can be located for engagement with the propelling means adapted to move the loose plates along the overhead track means in succession to the loading magazine.

A feature of the invention is the arrangement of the coacting upper and lower stretches of waffle molding and cooking plates. In essence, each plate of both such stretches has a studded waffle-molding face enclosed on three sides by opposite side walls joined together by a transverse wall at the leading edge of the plate, the depth of the side walls being greater than that of said transverse leading wall. The studs of the studded face of each plate mold the conventional indentations in the waffle product. The studded area of each plate may be varied widely, and, if desired, a dividing wall or walls may be provided to extend between said transverse leading wall and the trailing edge of the plate in order to form "multiple" waffle units in each molded transverse waffle section forming the continuous strip of waffle. The opposed faces of the side walls of the opposed successive side-by-side pairs of plates contact each other, in the upper stretch of plates resting on the lower stretch of plates. The combined depth of the contacting side walls of said opposed pairs of plates thus provides the gap between the upper stretch and lower stretch of plates into which the waffle-making dough mixture is delivered in molding and cooking the continuous strip of waffle as described.

In the case where the upper and lower stretches of waffle molding and cooking plates are formed respectively by a train of loose plates and an endless conveyor of linked plates as indicated above, each loose plate is as described above and conveniently has a lug sidewardly-extending from the base of each side wall of the plate for engagement with means adapted to elevate said plates and subsequently lower said plates in the course of the plates being stacked in the loading and receiving magazines at the trailing end and the loading end, respectively, of the endless conveyor. On the other hand, each linked plate of the endless conveyor assembly has a studded face with opposed side walls joined by a transverse leading wall as before; however, the trailing transverse side of the plate is convex whilst the leading transverse side of the plate is concave near the base of the plate. The outer face of the leading transverse wall is angularly inclined towards the trailing transverse side of the plate, the trailing ends of the side walls being inclined essentially to form a knife edge or point at the inner edge of each side wall. When a dividing wall or walls is provided in the studded face of the plate to form "multiple" waffle units as described above, the trailing end of each such dividing wall is undercut so as to be inclined somewhat parallel to the angular inclination of the outer face of the transverse leading wall.

The linked plates of the endless conveyor do not require the sidewardly-extending lugs of the loose plates. Instead, the linked plates are each provided with a depending lug from each of the four corners of the plate, said lugs being adapted to receive screw-threaded bolts or studs for connection of the plates to form an endless chain of plates as part of the endless conveyor assembly. The concave face of the endless conveyor assembly permit the chain of linked plates to proceed around drive-wheel means of the conveyor without interfering with the strip of waffle at that point, whilst said convex and concave faces and the inclined faces of the transverse leading wall and the trailing ends of the side walls and the trailing ends of any dividing walls of adjoining plates make substantial contact in presenting a substantially continuous molding surface for molding and cooking the dough mixture in a continuous strip. In addition, the angular inclination forming the knife edge or point at the trailing end of each side wall importantly permits excess waffle-making dough mixture to expel freely from the cooking plate assembly without unduly interfering with the linkage of the chain of linked plates of the endless conveyor assembly.

In order, however, that the invention may be fully understood, reference is now made to the accompanying drawings, which are part of this specification, and in which.

Referring to the drawings, the machine illustrated comprises a main frame 1 supporting an intermittently movable endless conveyor 2 which embodies a chain of linked waffle molding and cooking plates 3 as described above, the substantially horizontal upper stretch 4 of which is adapted to carry a train of loose complementary waffle molding and cooking plates 5 as described above. A secondary frame 6 mounted on the main frame 1 supports overhead longitudinally-extending tracking rails 7 in transverse spaced relationship and in substantial alignment with the upper stretch 4 of said endless conveyor 2. A vertically-disposed plate-loading magazine 8 is located between said upper stretch 4 of the endless conveyor 2 and the longitudinally-extending tracking rails 7 at the trailing end 9 of the endless conveyor 2 for holding a vertically-disposed stack 10 of said loose plates 5.

Loose-plate delivering means 11 synchronized to operate with the intermittent movement of the endless conveyor 2, delivers each successive lowermost loose plate 5 of said stack 10 from the plate-loading magazine 8 onto a linked plates 4 in delivering each said lowermost loose plate 5 from the bottom of the stack 10.

registering linked plate 4 of the horizontal stretch of the endless conveyor 2, when said conveyor 2 is momentarily stationary in the course of the intermittent movement, the stack 10 of said loose plates 5 in the plate-loading magazine 8 being periodically bodily deposited to rest momentarily on the registering plate of said lower stretch of linked plates 4 in delivering each said lowermost loose plate 5 from the bottom of the stack 10.

A vertically-disposed receiving magazine 12 is located between said upper stretch of the endless conveyor 2 and the longitudinally-extending tracking rails 7 at the leading end 13 of the endless conveyor 2 for holding a vertically-disposed stack 14 of said loose plates 5. Loose-plate elevating means 15 synchronized to operate with the intermittent movement of the endless conveyor 2, lifts each successive loose plate 5 from near the leading end 13 of said conveyor 2 and stacks them in said receiving magazine 12, as each successive loose plate 5 reaches the leading end 13 of said endless conveyor 2. Loose-plate propelling means 16 synchronized to operate with the intermittent movement of the endless conveyor 2, moves each successive topmost loose plate 5 in the receiving magazine 12 onto said tracking rails 7, where they are propelled in succession to the loading magazine 8, thus providing an endless succession or train of loose plates 5 for co-acting engagement with the upper stretch 4 of the linked plates 3.

A waffle-dough delivery pump 17 near the trailing end 9 of the endless conveyor 2, feeds a predetermined amount of waffle-making dough mixture from a hopper 18 onto the upper face of a linked plate 4 near said trailing end 9 of the endless conveyor 2 in timed interval, synchronized with the intermittent movement of the endless conveyor 2, so that the dough mixture is fed into and fills a gap between the opposed waffle-molding faces of the trailing loose plate 5 and the associated linked plate 4 in paired relationship, preparatory to each lowermost loose plate 5 being delivered from the loading magazine 8 to the linked plate 4 located immediately beneath said loading magazine 8. Heating means 19 heats said upper and lower stretches of plates as the complementary pairs of plates move from the trailing end 9 of the endless conveyor 2 to the leading end 13 of the endless conveyor 2. Waffle-severing means 20 near the leading end 13 of the endless conveyor 2 severs the continuous waffle strip 21 so produced, into selected waffle units after discharge of the waffle strip 21 from between the upper and lower stretches of plates, near the leading end 13 of the endless conveyor 2.

The main frame of the machine comprises two pairs of pedestal supports 22 and 23 forming respectively the trailing end and the leading end of the machine, said pedestals being connected together in longitudinal spaced relationship by pairs of longitudinal beams 24, and connected together in transverse spaced relationship by transverse bars 25. Connected to the inner faces of the pairs of pedestals 22 and 23 at both ends of the machine and supported by the transverse bars 25 is a pair of upper and lower conveyor guide rails 26 on both sides of the machine for the tracking of the linked plates of the upper and lower horizontal stretches of the endless conveyor 2. The linked plates of the endless conveyor 2 extend around sprocket wheels 27 at the trailing end and leading end of the machine, the shafts 28 of the sprocket wheels 27 being mounted in bearings in said pedestals 22 and 23.

The endless conveyor and other mechanism is operated by an electric motor 29 and associated transmission drive means comprising a reduction gear 30, pulley 31 operating a drive pinion 32 which in turn operates a main gear wheel 33 having a main drive shaft 34 and which in turn operates a Geneva wheel 35 for imparting intermittent motion to the shaft 28 carrying the sprocket wheel 27 around which the linked plates of the conveyor 2 pass at the trailing end of the machine.

Figure 5:
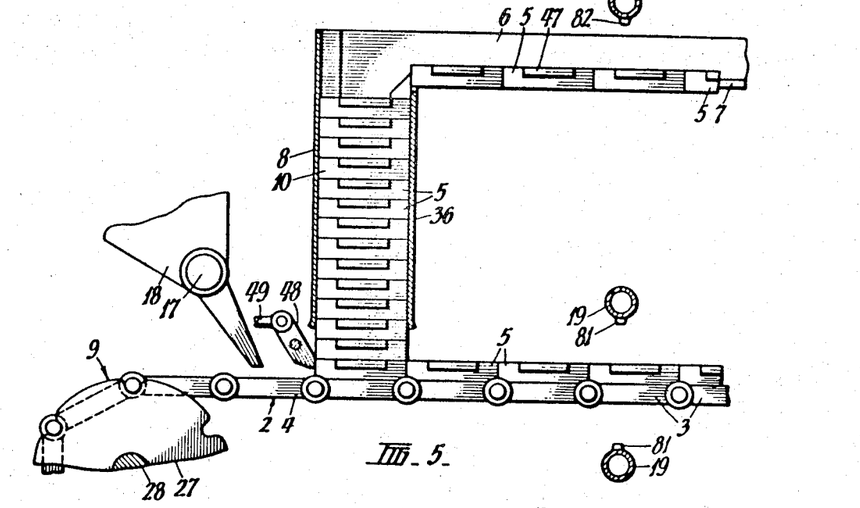
FIG. 5 is a cross-sectional detail at the trailing end of the machine, showing portion of the endless conveyor embodying the lower movable stretch of waffle molding and cooking plates, the means for feeding the waffle-making dough mixture onto trailing members of said lower molding and cooking plates, the stack of molding and cooking plates in the magazine or shute at the trailing end of the machine, and certain of the upper and lower flights of the upper stretch of molding and cooking plates.

The loose-plate loading magazine 8 and loose-plate delivery means 11 located at the trailing end 9 of the machine is best seen in FIG. 5, the loading magazine 8 comprising a pair of oppositely-disposed channel members 36 supported by the pedestals 22, the loose plates 5 being housed in channel members 36 of the loading magazine 8. As best seen in FIGS. 6-10, the stack of loose plates in the loading magazine 8 is supported for lifting and depositing by oppositely disposed stack lifting and depositing members 37 which are pivotally mounted on the ends of rocker arms 38 for horizontal oscillating movement, the opposite ends of the rocker arms 38 being mounted on transverse spindle 39. The rocker arms 38 are rocked to raise and lower the stack of loose plates by means of reciprocating levers 40 which co-act with cams 41 on the cam shaft 42 for the purpose. The horizontal oscillating movement imparted to the pivoted stack lifting and depositing members 37 is effected by link rods 43 connected at one end to said stack lifting and depositing members 37, and connected at the opposite end to bell-crank levers 44 mounted on the transverse spindle 39 and connected to reciprocating levers 45 which co-act with cams 46 on the cam shaft 42 for the purpose.

Figure 6:
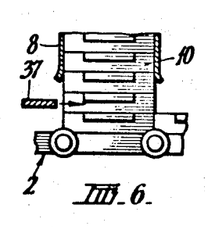
FIGS. 6, 7, 8 and 9 are a series of semi-diagrammatic detail views of the movements of the upper stretch of waffle molding and cooking plates at the trailing end of the machine, in moving from the magazine or shute onto the upper flight of waffle molding and cooking plates embodied in the endless conveyor constituting the lower stretch of waffle-molding and cooking plates.
Figure 7:
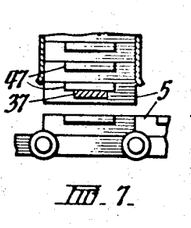
Figure 8:
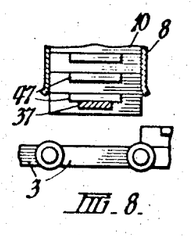
Figure 9:
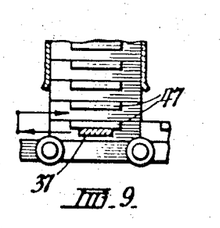

FIGS. 6-9 diagrammatically illustrate the horizontal oscillating movement, and the vertical lifting and depositing movements of the stack lifting and depositing members 37, in FIG. 6 said members 37 being shown in a position ready for horizontal oscillation in the direction of the arrow to engage with lugs 47 on the ends of the loose plates 5 so as to lift the stack of loose plates, as shown in FIG. 7, clear of the lowermost loose plate 5 of said stack 10, in depositing said lowermost loose plate 5 in register with the linked plate 4 of the upper stretch of such plates. FIG. 8 illustrates the movement of the linked plates 4 for depositing the next lowermost loose plate 5 of said stack 10 on the next succeeding linked plate 4, in continuously forming the trailing end of the upper stretch of loose plates 5. FIG. 9 illustrates the depositing of the stack 10 of loose plates onto said next succeeding linked plate 4, the lower arrow illustrating the return movement of the horizontal oscillation of said stack lifting and depositing members 37, followed by an elevating of said stack lifting and depositing members 37 into a position ready for the horizontal oscillating movement in the direction of the upper arrow, so as to engage with the lugs 47 of the next lowermost loose plate 5 in the stack 10 of said loose plates.

Figure 10:
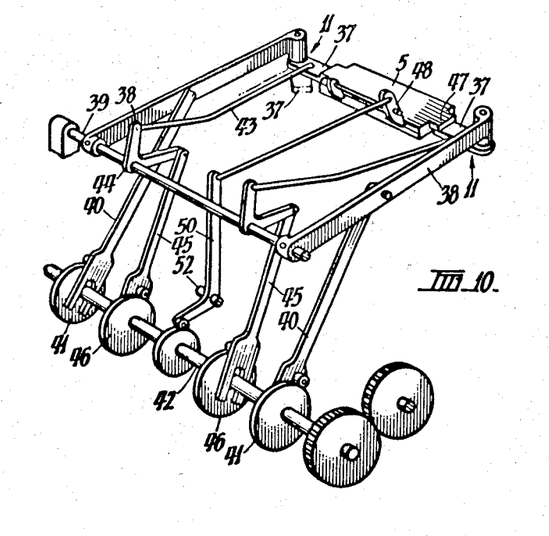
FIG. 10 is a semi-diagrammatic perspective view of a cam shaft with associated cams and related mechanism for operating the successive loading and registering of waffle molding and cooking plates of the upper stretch onto the upper flight of the lower stretch of waffle molding and cooking plates, as indicated in FIGS. 6–9.
Figure 11:
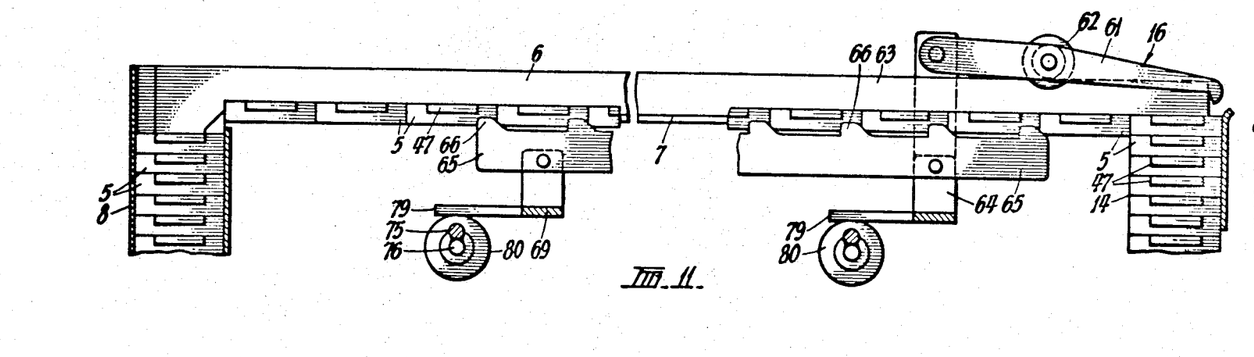
FIGS. 11 and 12 are cross-sectional detail elevational views showing the transfer and propelling means for moving each successive top waffle molding and cooking plate from the magazine or shute at the leading end of the machine, into engagement with the walker-beams mechanism for propelling the waffle molding and cooking plates in returning them to the magazine or shute at the trailing end of the machine.
Figure 12:
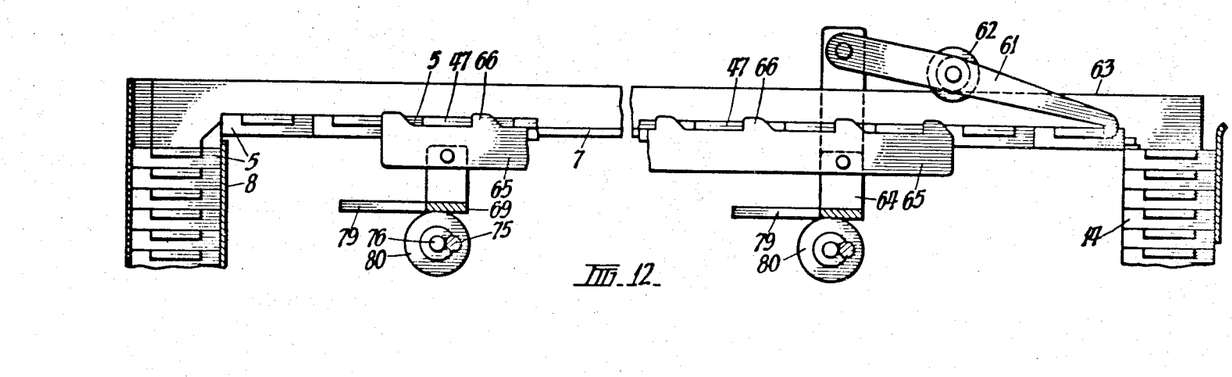

In depositing each lowermost loose plate 5 onto the linked plate 4 located immediately therebeneath, it is important that each said lowermost loose plate 5 be brought into exact register with the linked plate 4 so as to be contiguous with the trailing end of the preceding loose plate 5 at the trailing end of the upper stretch of loose plates 5. As best seen in FIGS. 5 and 10, loose-plate pushing members 48 are provided for the purpose indicated, said pushing members 48 being operated by a link rod 49 connected to bell-crank lever 50 arranged to co-act with cam 51 on the cam shaft 42, the arrangement being such that reciprocation of the link rod 49 moves the pushing members 48 backwards and forwards about the spindle 52, thus nudging each loose plate 5 against the trailing end of the preceding loose plate 5, in depositing each said loose plate 5 in succession onto the linked plates 4.

Figure 1:
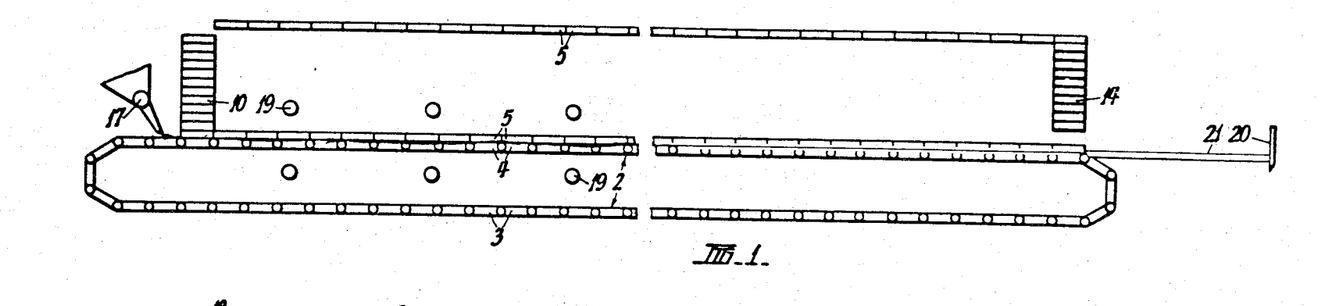
FIG. 1 is a diagrammatic view illustrating the upper and lower movable stretches of waffle molding and cooking plates adapted to be moved in side-by-side relationship from the left-hand or trailing end of the machine to the right-hand or leading end of the machine, the view illustrating the progressive formation of the waffle strip at the trailing end of the machine, the continuous length of waffle strip so formed being cooked as it travels to the leading end of the machine, where it discharges from the movable stretches of waffle molding and cooking plates for severing onto selected waffle units, conveniently by means of the guillotine illustrated.
Figure 2:
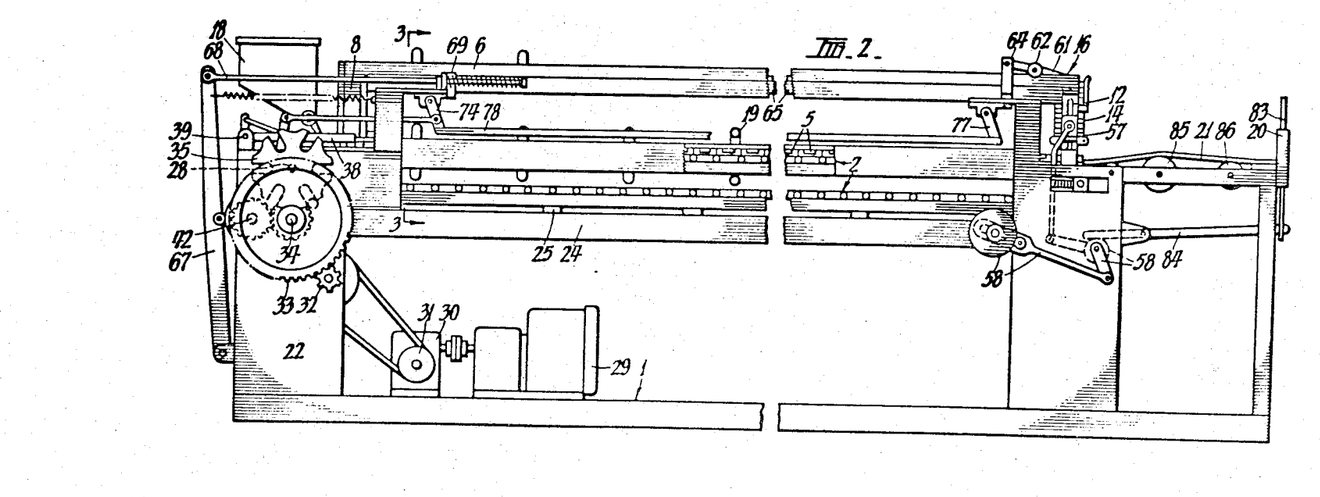
FIG. 2 is a front elevation of a waffle molding and cooking machine in accordance with one practical embodiment, said machine being adapted to be operated intermittently.
Figure 3:
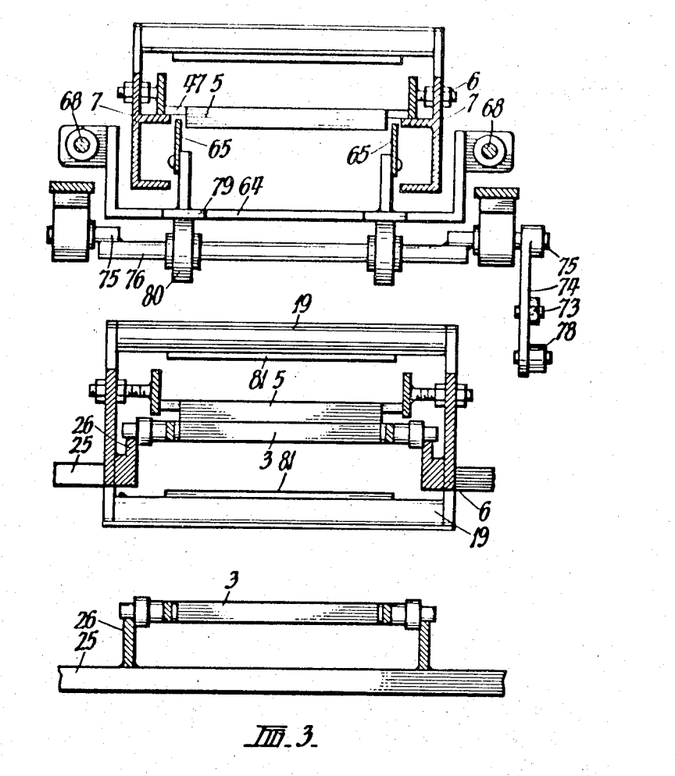
FIG. 3 is a cross-sectional end view taken at lines 3—3 of FIG. 2, as viewed in the direction indicated by the arrows.
Figure 4:
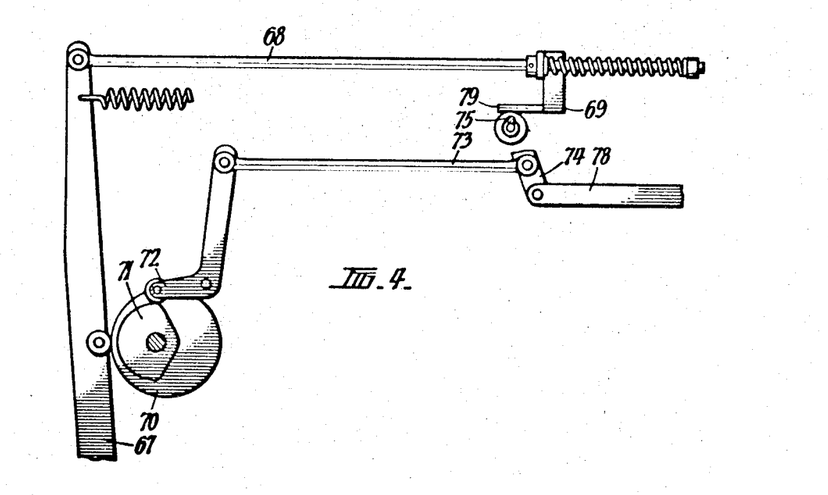
FIG. 4 is a cross-sectional detail of portion of the walker-beams operating mechanism at the left-hand or trailing end of the machine of FIG. 2, said walker-beams mechanism being adapted to move an upper flight of the upper stretch of waffle molding and cooking plates, in returning said plates from the leading end of the machine to the trailing end of said machine.
Figure 13:
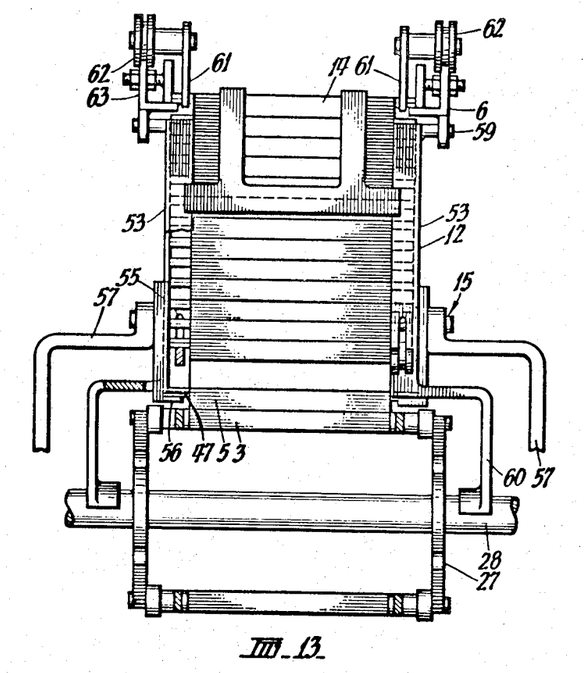
FIG. 13 is a cross-sectional detail end view of part of the machine seen in FIG. 2, as viewed at the right-hand or leading end of the machine illustrated in FIG. 2.
Figure 14:
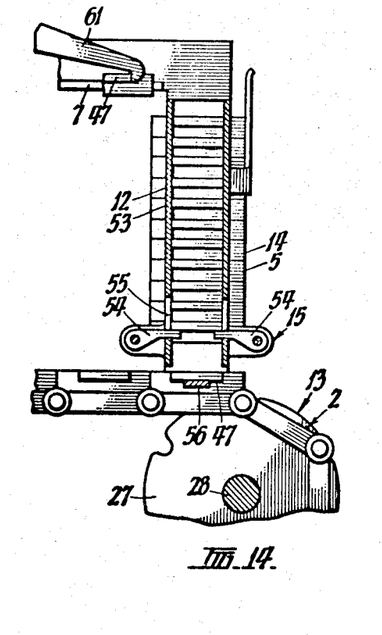
FIGS. 14 and 15 are cross-sectional detail elevational views showing the lifting or elevating means for the waffle molding and cooking plates at the leading end of the machine, the magazine or shute holding a stack of such plates at that end of the machine; and the propelling or transfer means for moving each successive top waffle molding and cooking plate from the magazine, into association with the walker-beams mechanism as indicated.
Figure 15:
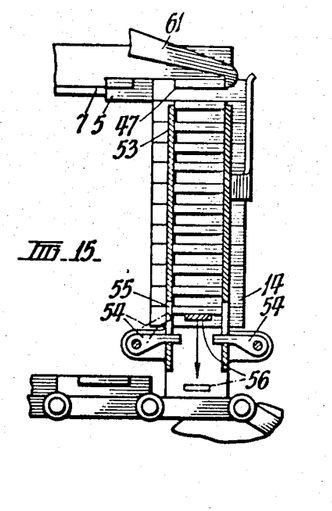

The loose-plate receiving magazine 12 and loose-plate elevating means 15 at the leading end 13 of the machine is best seen in FIGS. 13-15, the receiving magazine 12 comprising a pair of oppositely disposed channel members 53 supported by the pedestals 23, the loose plates 5 being housed between said channel members 53 of the receiving magazine 12. FIG. 14 shows the stack 14 of loose plates in the receiving magazine 12 and supported by oppositely disposed pawls 54, the ends of said pawls 54 projecting through slots 55 in the channel members 53 so as to engage with the bottom of the slotted portion of the channel members 53 and support the stack 14 of loose plates in the receiving magazine 12. Oppositely disposed foot members 56, seen in FIGS. 13-15, engage with the lugs 47 of each successive loose plate 5 reaching the leading end of the machine, so as to elevate each said loose plate 5 from the leading end of the horizontal stretch of the linked plates 4, in stacking each said loose plate 5 beneath the stack 14 of loose plates in the receiving magazine 12, in the course of elevating said stack 14 of loose plates to the top of the channel members 53 ready for engagement of the topmost loose plate 5 with the loose plate propelling means 16. Said foot members 56 are adapted to be reciprocated by reciprocating arms 57, as best seen in FIG. 13, for the purpose of elevating each said loose plate 5 as described, the reciprocating arms 57 being operated by a cam and lever assembly 58 mounted on the pedestals 23 at the leading end of the machine, as seen in FIG. 2.

FIG. 13 shows the assembly of the loose plate receiving magazine 12 with the stack 14 of loose plates therein, mounted on the secondary frame 6 of the machine by pins 59 to allow for lengthwise expansion of the mechanism, arising from the heating to which the upper and lower stretches of waffle molding and cooking plates are subjected in cooking the continuous waffle strip as described. The assembly of the loose plate receiving magazine 12 with the stack 14 of loose plates therein, is supported for the same purpose, by the legs 60 adapted to rest on the conveyor shaft 28 at the leading end of the machine.

Secondary frame 6 mounted on the main frame 1 supports the pair of transversely spaced longitudinally disposed tracking rails 7 along which the loose plates 5 are propelled in travelling from the loose-plate receiving magazine 12 to the loose-plate loading magazine 8. The mechanism for transferring each topmost loose plate 5 from the stack 14 of loose plates in the loose-plate receiving magazine 12 onto the tracking rails 7, and the mechanism for propelling each such loose plate along said tracking rails 7, intermittently, is best seen in FIGS. 11–15. Each topmost loose plate 5 of the stack 14 of loose plates in the magazine 12 is engaged by hooks 61 having rollers 62 which track on rails 63, the hooks 61 being connected to a U-frame or bridge member 64 near the leading end of the machine and constructed and operated so as to move backwards and forwards, and, up and down, in conjunction with walker-beam members 65 which are adapted to propel the loose plates 5 along said tracking rails 7, intermittently. Upstanding teeth 66 of the walker-beam members 65 protrude so as to project into engagement with the lugs 47 of the loose plates 5, in propelling said loose plates along the tracking rails 7.

The motion of the walker-beam members 65 is forwards and down, and, backwards and up, whilst said members remain horizontal, so as to simultaneously push all of the loose plates 5 on the tracking rails 7, a predetermined distance along the length of said tracking rails 7, intermittently, in timed relationship with the intermittent movement of the endless conveyor 2 and the associated mechanism described above. The mechanism for operating the walker-beam members 65 is seen in FIGS. 2, 4, 11 and 12. Said mechanism consists of spring loaded lever arms 67 connected to a U-frame or bridge member 69 near the trailing end of the machine, by link rods 68, said lever arms 67 co-acting with cam 70, whilst cam 71 co-acts with bell-crank levers 72 which are connected by link rods 73 to eccentric-operating levers 74 near the trailing end of the machine, said eccentric-operating levels 74 being connected to stud-shafts 75 which in turn are fixed to eccentric spindle 76, there being corresponding eccentric-operating levers 77 near the trailing end of the machine, and the pairs of eccentric operating levers being connected by link bars 78. Plates 79 on the U-frames or bridging members 64 and 69 engage with rollers 80 on the eccentric spindle 76 whereby said U-frames or bridging members 64 and 69 are periodically moved up and down in the course of being moved backwards and forwards by the reciprocating action of the spring-loaded lever arms 67, as indicated.

The waffle-dough delivery pump 17 may consist of a piston fitted into a cylinder which is integral with the hopper 18, the lower end of the cylinder having a dough inlet port from the hopper 18 and also having a dough outlet port for delivery of the dough mixture by the piston. This arrangement preferably is such that the cylinder can be turned about its axis so that the dough inlet ports correspond whereby the piston, when moving in an upward position fills the cylinder with dough mixture, whereupon the cylinder turns and becomes the outlet port so that when the cylinder is moved to a downward position the dough mixture is ejected onto a linked plate 4 located immediately beneath said outlet port. The pumping cycle is arranged to be synchronized with the intermittent movement of the endless conveyor 2, by being connected with a piston-operating cam associated with the Geneva movement, whereby a predetermined amount of dough mixture is delivered to each linked plate 4 as described.

The assembly of the upper and lower stretches of waffle molding and cooking plates 4 and 5 is conveniently heated by a bank of ignited gas jets 81 located above and below said stretches of plates and arranged so that the ignited gas impinges on the outer faces of the upper and lower stretch of said plates. In addition, ignited gas jets 82 are provided to impinge on the stretch of loose plates 5 approaching the loose-plate loading magazine 8 near the trailing end of the machine in order to have such plates at a suitable temperature ready for molding and cooking the dough mixture at the trailing end of the continuous waffle strip, when said loose plates 5 are being loaded in succession onto the linked plates 4 at the trailing end of the machine.

The waffle-severing means 20 near the leading end of the machine for severing the continuous waffle strip 21, discharging from between the upper and lower stretches of plates, conveniently consists of a guillotine device 83 operated by a lever 84 in association with the cam and lever assembly 58, the guillotine thus being synchronized to sever the continuous waffle strip 21 in timed relationship with the intermittent movement of the conveyor 2. The continuous waffle strip 21 is caused to extend from between the upper and lower stretches of plates 4 and 5, over rollers 85 and 86, thence through the guillotine device 83, selected waffle units being severed from the continuous waffle strip 21 when the conveyor 2 is momentarily stationary or halted in the course of the intermittent movement of the machine. The severed waffle units may be collected in suitable containers for packaging, or, may be conveyed on suitable conveyor means to a packaging area remote from the machine.

Although the machine illustrated in the drawings is shown to have the guillotine device 83 for severing the continuous waffle strip 21 into selected waffle units by a cutting operation, it is to be understood that the selected waffle units may be separated from the continuous waffle strip 21 by any suitable means and in any suitable manner.

Figure 16:
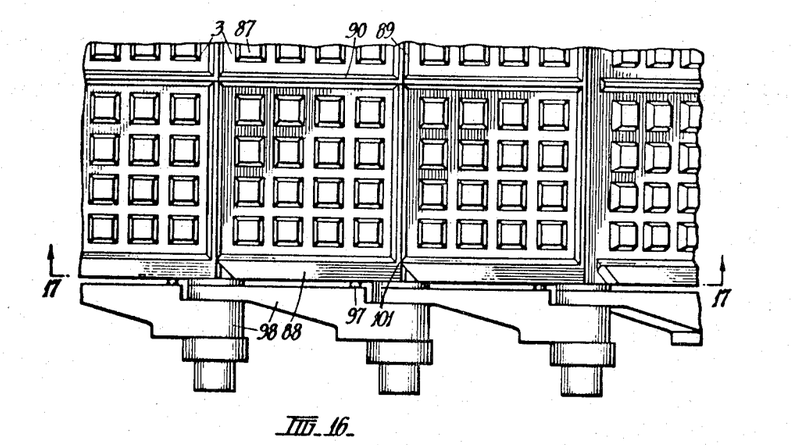
FIG. 16 is a detail plan view of part of the upper flight of the lower stretch of waffle molding and cooking plates, at the leading end of the machine.
Figure 17:
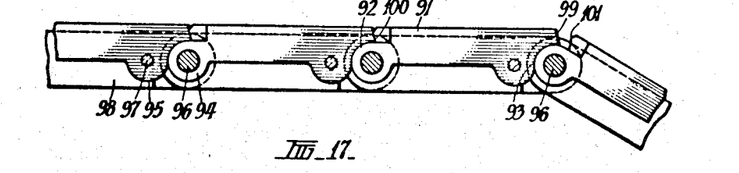
FIG. 17 is a cross-sectional view taken at lines 17—17 of FIG. 16.
Figure 18:
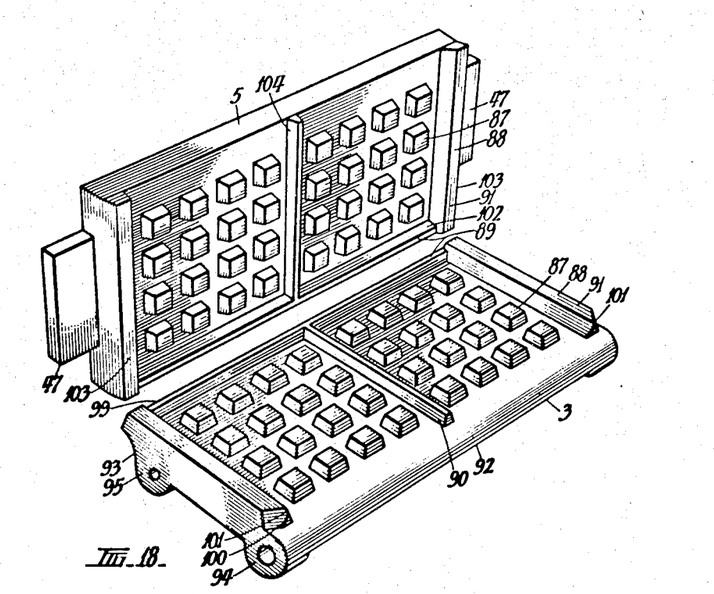
FIG. 18 is a semi-diagrammatic perspective view of a complementary pair of the waffle molding and cooking plates, the upper plate of said complementary pair being disposed in an upstanding position to illustrate adequately the opposed molding faces of both said plates, in accordance with the invention.

FIGS. 16–18 show in detail the features of the co-acting waffle molding and cooking plates 3 and 5 of the invention. These figures of the drawings, more particularly FIG. 18, show each such plate to have a studded waffle-molding face 87 enclosed by opposite side walls 88 joined together by a transverse wall 89 at the leading edges of the plates, the depths of the side-walls 88 being greater than the transverse walls 89, for convenience of appearance in the final product, the dividing walls 90 being provided to extend between the transverse leading walls 89 and the trailing edge of the plate. Opposed faces 91 of the side walls 88 of each complementary pair of plates contact each other when said plates form the upper and lower stretches of plates described above. The combined depth of the contacting side walls 89 thus provide the gap between the upper and lower stretches of plates into which the waffle-making dough mixture is fed in molding and cooking the continuous waffle strip.

Each linked plate 3 has a convex trailing end 92 and a concave leading end 93 for connection of a succession of such plates, as best seen in FIGS. 16 and 17, whereby the linked plates 3 constitute a relatively continuous surface in the horizontal stretch in order to mold the continuous waffle strip, and, at the same time, be able to extend around the sprocket wheels 27 of the endless conveyor 2. Apertured lugs 94 and 95 depend from the corners of the base of each linked plate 3, the lugs 94 being adapted to receive studs 96 for pivotal movement of each fixed plate 3 around the sprocket wheels 27, whilst pins 97 project from the links 98 into the apertures in the lugs 95 to retain the linked plates 3 in continuous engagement with each other, as indicated.

The outer face 99 of the leading transverse wall 89 of the fixed plate 3 as shown in FIG. 18 is angularly inclined towards the trailing transverse side of said plate, whilst the trailing ends 100 of the side walls 88 are inclined essentially to form a knife edge or point 101 at the inner edge of said side walls 88. The dividing wall 90 also has its trailing end undercut so as to be inclined parallel to the angular inclination of the outer face 99 of said transverse leading wall 89, in this way any excess waffle making dough mixture being able to bleed through said knife edge and the next adjoining face of the succeeding linked plate 4 in the horizontal stretch of plates. Likewise, the leading face of the corresponding transverse wall 102 of the loose plate 5, and the trailing ends of the side walls 103 and the dividing wall 104 of the loose plate 5, are angularly inclined as shown for the purposes indicated.

In operation, starting a cooking cycle, with the loading magazine 8 and the receiving magazine 12 stacked with loose plates and a train of loose plates extending along the substantially horizontal stretch 4 of the endless conveyor 2, and also along the tracking rails 7 from the receiving magazine 12 to the loading magazine 8, a predetermined quantity of waffle-making dough mixture is delivered by the waffle-dough delivery pump 17 to each linked plate of the endless conveyor 2. At the same time, the stack 10 of loose plates in the loading magazine 8 is deposited onto the linked plate immediately beneath said stack 10 of loose plates by means of the loose-plate delivery means 11, in this way the entire weight of the stack 10 of loose plates in the loading magazine 8 pressing on the quantity of dough in the gap between each lowermost loose plate and each corresponding linked plate, in molding the continuous waffle strip 21. This takes place when the Geneva wheel 35 has halted the endless conveyor 2 in the course of the intermittent movement. The stack of loose plates 10 in the loading magazine 8 is then lifted to allow the endless conveyor 2 to operate as described. Simultaneously with the halting of the endless conveyor 2, a loose plate at the leading end of the endless conveyor 2 is elevated from the endless conveyor 2 and delivered to the receiving magazine 12. Simultaneously with the halting of the conveyor, the topmost loose plate of the stack 14 of plates in the receiving magazine 12 is engaged by the loose plate transfer and propelling means 16 and moved onto and along the tracking rails 7 whereby the train of loose plates 5 on the tracking rails 7 is propelled toward the loading magazine 8, each successive leading plate thus being delivered to the loading magazine 8. Simultaneously with the halting of the conveyor, the guillotine knife 83 is operated to sever a waffle unit from the leading end of the continuous waffle strip 21, said continuous waffle strip 21 conveniently along a transverse scoring or recess line molded at regular intervals in the continuous strip of waffle, by means of the transverse leading walls of the oppositely-disposed waffle molding and cooking plates, said transverse walls projecting into the thickness of the continuous strip of waffle somewhat similar to the indentations formed in said strip by means of the studs of the studded faces of said co-acting plates.

What is claimed is:

1. A machine for making waffles and like food products, said machine comprising substantially horizontal upper and lower movable continuous stretches of waffle molding and cooking plates constituted by an endless succession of waffle molding and cooking plates each of which has sideward-marginal longitudinally-extending contacting surfaces, and an endless succession of complementary waffle molding and cooking plates each of which has sideward-marginal longitudinally extending contacting surfaces, the first plates being placed into the second plates such that said contacting surfaces thereof are in opposed contacting relationship and between the inner margins thereof there is a gap with opposed waffle molding faces, the opposed pairs of said plates being in end-to-end contacting relationship and being adapted to be moved from a trailing end of the machine to a leading end of the machine, the substantially horizontal upper and lower continuous stretches of said plates being provided with a continuous gap for the molding and cooking of a waffle-making dough mixture into a continuous waffle strip between said stretches of plates in the movement of said stretches of plates through a waffle-cooking zone; means for loading each successive trailing plate of said upper continuous stretch of plates onto each successive registering plate at the trailing end of said lower continuous stretch of plates whereby each said trailing plate of the upper continuous stretch is loaded onto each said trailing plate of the lower continuous stretch by a directly downward movement and the sideward-marginal longitudinally-extending contacting surfaces of the registering trailing plates are maintained pressed together during a period of initial molding and cooking of the waffle-making dough mixture in progressively forming the trailing end of said continuous waffle strip between said trailing registering plates; means for feeding the waffle-making dough mixture onto the trailing end of said lower stretch of plates whereby a charge of the dough mixture is on said registering trailing plate of said lower stretch of plates for progressively forming the trailing end of said continuous waffle strip between the opposed faces of each complementary pairs of plates at the trailing end of said stretches of plates; means for moving said endless succession of complementary pairs of waffle molding and cooking plates forming the upper and lower stretches of plates from the trailing end of the machine to the leading end of the machine; means for heating said upper and lower stretches of plates whereby said dough mixture between the opposed faces of said stretches of plates can be cooked to form a continuous waffle strip; and waffle severing means for severing the continuous waffle strip into selected waffle units after said continuous waffle strip is discharged from between said uppor and lower stretches of plates at the leading end of said machine.

2. The machine of claim 1, wherein said means for loading the upper waffle molding and cooking plates in endless succession onto said endless succession of lower waffle molding and cooking plates comprises means for depositing each trailing upper molding and cooking plate in succession from the bottom of a stack of such plates and in which said stack of plates is deposited bodily onto the registering plate of said lower stretch of plates during the period of the initial molding and cooking of the waffle-making dough mixture progressively forming the trailing end of said continuous waffle strip between said registering upper and lower plates.

3. The machine of claim 1, wherein the lower movable stretch of waffle molding and cooking plates is the upper flight of an endless conveyor of such plates linked together endlessly, and the upper movable stretch of waffle molding and cooking plates is formed by a succession of loose plates adapted to be carried by the upper flight of the endless conveyor from the trailing end of said endless conveyor to the leading end of said conveyor, in combination with means for endlessly delivering the succession of loose plates to the trailing end of the conveyor, and means for endlessly removing the loose plates from the leading end of the conveyor after traversing the upper flight of said conveyor, and means for endlessly returning the loose plates to said means for endlessly delivering the succession of loose plates to the trailing end of the conveyor.

4. The machine of claim 1, wherein each waffle molding and cooking plate has a studded waffle molding face enclosed on three sides by opposite side walls joined together by a transverse wall at the leading end of the plate, the depth of the side walls being greater than that of said transverse leading wall, the combined depth of the side walls of said opposed pairs of plates providing the depth of the gap between the upper stretch and lower stretch of plates into which the waffle-making dough mixture is delivered in molding and cooking the continuous strip of waffle.

5. The machine of claim 4, wherein a train of loose waffle molding and cooking plates forms the upper stretch of such plates, and a train of linked waffle molding and cooking plates embodied in the endless conveyor assembly forms the lower stretch of such plates, each of said loose plates having lugs sidewardly-extending from the base of each side wall of the plate and the trailing ends of the side walls being angularly inclined, each said linked plate having a convex trailing transverse side and a concave leading transverse side, the outer face of the leading transverse wall being angularly inclined towards the trailing transverse side of the plate, and the trailing ends of the side walls being inclined to form a knife edge at the inner edge of each side wall, each said linked plate having a lug depending from each of the four corners of the plate, said lugs being apertured to receive studs for connection of the plates to link members in forming an endless train of linked plates presenting a substantially continuous molding surface for molding and cooking the dough mixture in a continuous waffle strip.

6. A machine for making waffles and like food products, said machine comprising an endless conveyor including linked waffle molding and cooking plates having a substantially horizontal upper flight adapted to carry an endless succession of loose complementary waffle molding and cooking plates from a trailing end of said conveyor to a leading end of said conveyor and in registering paired relationship with the linked waffle molding and cooking plates of said substantially horizontal upper flight of the endless conveyor, said waffle molding and cooking plates having complementary sideward-marginal longitudinally-extending contacting surfaces which are in opposed contacting relationship and between the inner margins of which there is a gap with opposed waffle molding faces and wherein the opposed pairs of said plates are in end-to-end contacting relationship in forming the substantially horizontal upper and lower continuous stretches of said plates so that there is provided a continuous gap for the molding and cooking of a waffle-making dough mixture into a continuous waffle strip between said stretches of plates in the movement of said stretches of plates through waffle cooking zone; an overhead track means disposed above the endless conveyor and extending between the trailing end and the leading end of said conveyor; means including a plate receiving magazine near the leading end of said endless conveyor for elevating each successive loose plate at the leading end of said conveyor in stack form to the trailing end of said overhead track means; propelling means associated with said overhead track means for moving said loose plates from the plate receiving magazine in succession from the trailing end of said overhead track means to the leading end of said overhead track means; means including a plate loading magazine near the leading end of said overhead track means for the loading of said loose plates in stack form in the plate loading magazine and the returning of said loose plates in succession to the trailing end of the endless conveyor; waffle-dough delivery means near the trailing end of the endless conveyor for feeding a waffle-making dough mixture onto the upper face of the waffle molding and cooking plates of said substantially horizontal upper flight near the trailing end of the endless conveyor whereby the dough mixture is charged to fill the continuous gap between the opposed waffle molding faces of said succession of loose plates and the linked plates of said endless conveyor in the course of each successive loose plate being located in paired relationship with the complementary linked plate at the trailing end of the endless conveyor; means for heating the upper and lower stretches of plates moving from the trailing end of the endless conveyor to the leading end of the endless conveyor whereby the dough mixture between the opposed faces of said stretches of plates is cooked to form a continuous waffle strip, and waffle severing means near the leading end of said endless conveyor for severing said continuous waffle strip into waffle units after the waffle strip is discharged from between said stretches of plates at the leading end of said endless conveyor.

7. The machine of claim 6, wherein the endless conveyor is adapted to be moved intermittently, the loose plate elevating means being adapted to elevate each loose plate in succession from the leading end of said endless conveyor when the endless conveyor has halted momentarily in the course of the intermittent movement; the loose plate propelling means associated with the overhead track means being adapted to move each uppermost elevated loose plate in succession along the overhead track means from the trailing end of said overhead track means to the leading end of said overhead track means, when the endless conveyor has halted; the loose plate loading means near the leading end of the overhead track means being adapted to load each lowermost loose plate onto the selected linked plate of the endless conveyor near the trailing end of said conveyor, when the endless conveyor has halted; the waffle-making dough mixture feeding means being adapted to feed a predetermined quantity of said dough mixture onto the upper face of the linked plate adjacent to the trailing linked plate of the endless conveyor onto which the lowermost loose plate is to be loaded in registering with the trailing linked plate of the endless conveyor, when the endless conveyor has halted; and the waffle severing means being adapted to be operated to sever waffle units in succession from the leading end of the continuous waffle strip, when the endless conveyor has halted, all in timed relationship.

8. The machine of claim 6, wherein each waffle molding and cooking plate has a studded waffle molding face enclosed on three sides by opposite side walls joined together by a transverse wall at the leading edge of the plate, the depth of the side walls being greater than that of said transverse leading wall, the combined depth of the side walls of said opposed pairs of plates providing the depth of the gap between the upper stretch and lower stretch of plates into which the waffle-making dough mixture is delivered in molding and cooking the continuous strip of waffle.

9. The machine of claim 8, wherein a train of loose waffle molding and cooking plates forms the upper stretch of such plates, and a train of linked waffle molding and cooking plates embodied in the endless conveyor assembly forms the lower stretch of such plates, each said loose plate having lugs sidewardly-extending from the base of each side wall of the plate and the trailing ends of the side walls being angularly inclined, each said linked plate having a convex trailing transverse side and a concave leading transverse side, the outer face of the leading transverse wall being angularly inclined towards the trailing transverse side of the plate, and the trailing ends of the side walls being inclined to form a knife edge at the inner edge of each side wall, each said linked plate having a lug depending from each of the four corners of the plate, said lugs being apertured to receive studs for connection of the plates to link members in forming an endless train of linked plates presenting a substantially continuous molding surface for molding and cooking the dough mixture in a continuous waffle strip.

10. A method of making waffles and like food products in the form of a continuous strip which is severed into individual waffle units, said method comprising loading an endless succession of waffle molding and cooking plates having sideward-marginal longitudinally-extending contacting surfaces onto an endless succession of complementary waffle molding and cooking plates having sideward-marginal longitudinally-extending contacting surfaces so that said contacting surfaces are in opposed contacting relationship and between the inner margins of which there is a gap with opposed waffle molding faces and wherein the opposed pairs of said plates are in end-to-end contacting relationship in forming substantially horizontal upper and lower continuous stretches of said plates so that there is provided a continuous gap for the molding and cooking of a waffle-making dough mixture into a continuous waffle strip between said stretches of plates in the movement of said stretches of plates through a waffle-cooking zone, each successive trailing plate of said upper continuous stretch of plates being loaded onto each successive registering trailing plate of said lower continuous stretch of plates by a directly downward movement and the sideward-marginal longitudinally-extending contacting surfaces of the registering trailing plates being maintained pressed together during a period of initial molding and cooking of the waffle-making dough mixture in progressively forming the trailing end of said continuous waffle strip between said trailing registering plates; feeding waffle-making dough mixture onto ous waffle strip from between said moving stretches of said lower stretch of plates whereby a charge of waffle-making dough mixture is on each successive registering trailing plate of said lower continuous stretch of plates when each successive registering trailing plate of the upper continuous stretch of plates is loaded in progressively forming the trailing end of said continuous waffle strip; moving and heating said stretch of plates so that they traverse said waffle-cooking zone whereby the waffle-making dough mixture between said opposed faces of the stretches of plates is molded and cooked to form the continuous waffle strip; discharging the molded and cooked continuous waffle strip from between said moving stretches of plates at the leading end of said stretches of plates; and severing the discharged continuous waffle strip into selected waffle units.

11. The method of claim 10, wherein each successive waffle molding and cooking plate forming the upper continuous stretch of plates is loaded onto each successive registering plate forming the lower continuous stretch of plates by being deposited in succession from the bottom of a stack of such plates which are bodily deposited so as to rest on said registering plate of the lower stretch of plates whereby said registering trailing plates are maintained pressed together during the period of initial molding and cooking of the waffle-making dough mixture in progressively forming the trailing end of said continuous waffle strip between said trailing registering plates.

12. The method of claim 10, wherein the loading of the endless succession of waffle molding and cooking plates onto the endless succession of complementary waffle molding and cooking plates, the feeding of the waffle-making dough mixture onto the waffle molding faces of plates at the trailing end of said lower stretch of plates, the moving of said stretches of plates through the waffle cooking zone, the discharging of the continuous waffle strip from betwen the stretches of plates, and the severing of the continuous waffle strip into selected waffle units, are all effected in intermittent timed relationship.

References Cited
UNITED STATES PATENTS

| | | | |
|---|---|---|---|
| 1,014,375 | 1/1912 | Carpenter et al. | 99—373 |
| 1,379,987 | 5/1921 | Israel | 99—383 |
| 2,660,961 | 12/1953 | Neutelings et al. | 99—373 |
| 3,058,434 | 10/1962 | De Jersey | 99—360 |
| 3,064,590 | 11/1962 | Thiele | 425—371 |
| 3,158,486 | 11/1964 | Morck et al. | 99—86 |
| 3,286,816 | 11/1966 | Knaust et al. | 198—149 |

BILLY J. WILHITE, Primary Examiner

A. O. HENDERSON, Assistant Examiner

U.S. Cl. X.R.

99—355, 373, 443 C; 426—512